United States Patent
Chengalva (10) Patent No.: US 10,850,826 B2
(45) Date of Patent: Dec. 1, 2020

(54) AIRCRAFT WING SPACE FRAME

(71) Applicant: The Boeing Company, Chicago, IL (US)

(72) Inventor: Mahesh Krishna Chengalva, Bothell, WA (US)

(73) Assignee: The Boeing Company, Chicago, IL (US)

( * ) Notice: Subject to any disclaimer, the term of this patent is extended or adjusted under 35 U.S.C. 154(b) by 496 days.

(21) Appl. No.: 15/468,866

(22) Filed: Mar. 24, 2017

(65) Prior Publication Data
US 2018/0273159 A1 Sep. 27, 2018

(51) Int. Cl.
*B64C 3/00* (2006.01)
*B64C 3/22* (2006.01)
(Continued)

(52) U.S. Cl.
CPC ............. *B64C 3/00* (2013.01); *B64C 3/187* (2013.01); *B64C 3/22* (2013.01); *B64C 3/26* (2013.01);
(Continued)

(58) Field of Classification Search
CPC .... B64C 3/22; B64C 3/26; B64C 3/00; B64C 3/18; E04D 13/15; E04B 2001/1927;
(Continued)

(56) References Cited

U.S. PATENT DOCUMENTS

| | | |
|---|---|---|
| 1,291,678 A | 1/1919 | Kleckler |
| 1,325,499 A | 12/1919 | Rapp et al. |

(Continued)

FOREIGN PATENT DOCUMENTS

| | | | |
|---|---|---|---|
| EP | 2947009 A1 | 11/2015 | |
| FR | 673934 A | * 1/1930 | ............... B64C 3/00 |

OTHER PUBLICATIONS

Google, French to English translation of wing covering; https://www.google.com/search?q=french+to+english; accessed Jul. 20, 2019 ( Year: 2019).*

(Continued)

*Primary Examiner* — Medhat Badawi
*Assistant Examiner* — Vicente Rodriguez
(74) *Attorney, Agent, or Firm* — Miller, Matthias & Hull LLP (57) ABSTRACT

Aircraft wings have an interior volume that incorporates a space frame as a primary supporting structure of the wing, and enables securement of an aircraft fuselage to the wing. The space frame includes carbon fiber rods arranged to handle tensile and compression loads otherwise carried by conventional wing spars, ribs, and stringers normally connected to heavy structural metal wing box joints at the sides of a fuselage for attachment of left and right wings. The space frame also includes sleeve and shaft connectors secured to the carbon fiber rods, the connectors arranged in truss-like configurations for preventing buckling of the carbon fiber rods. The space frame is designed to extend at least midspan between wings, so that traditional wing box joints on a fuselage can be eliminated. Finally, wing skin panels secured to the space frame are designed to support only aerodynamic loads of flight.

20 Claims, 6 Drawing Sheets

(51) Int. Cl.
*B64C 3/26* (2006.01)
*B64C 3/18* (2006.01)
*B64F 5/00* (2017.01)
*B64C 1/00* (2006.01)

(52) U.S. Cl.
CPC ........ *B64F 5/00* (2013.01); *B64C 2001/0072* (2013.01)

(58) Field of Classification Search
CPC ..... E04B 2001/2415; E04B 2001/2448; Y10T 403/34; Y10T 403/342; Y10T 403/347
See application file for complete search history.

(56) References Cited

U.S. PATENT DOCUMENTS

| | | | | |
|---|---|---|---|---|
| 1,328,963 A * | 1/1920 | Page | ........................ | B64C 3/22 403/176 |
| 1,403,444 A | 1/1922 | Rapp et al. | | |
| 1,545,129 A * | 7/1925 | Cook, Jr. | ................... | B64C 3/00 52/653.2 |
| 1,555,409 A * | 9/1925 | Gilmore | .................... | B64C 3/00 244/123.4 |
| 2,791,386 A * | 5/1957 | Kastan | ..................... | B64C 3/18 244/123.8 |
| 5,216,799 A * | 6/1993 | Charnock | ................. | B64C 3/18 244/133 |
| 7,037,568 B1 * | 5/2006 | Rogers | ............... | B29C 65/5057 244/131 |
| 7,891,949 B2 | 2/2011 | Baker et al. | | |
| 8,517,309 B2 * | 8/2013 | Robinson | .................. | B64C 1/12 244/119 |
| 8,602,356 B2 * | 12/2013 | Maenz | ...................... | B64C 3/00 244/123.1 |
| 9,010,688 B2 * | 4/2015 | Shome | ..................... | B64C 1/12 244/119 |
| 9,096,324 B2 | 8/2015 | Erickson et al. | | |
| 9,156,538 B1 * | 10/2015 | Stern | ......................... | B64C 1/12 |
| 2008/0245927 A1 | 10/2008 | Kulesha | | |
| 2009/0196758 A1 | 8/2009 | Baker et al. | | |
| 2009/0224102 A1 * | 9/2009 | White | .................... | B64C 1/068 244/119 |
| 2010/0126108 A1 * | 5/2010 | Andrikopoulos | ......... | E04B 1/19 52/741.1 |
| 2010/0133382 A1 * | 6/2010 | Pahl | ......................... | B64C 1/08 244/120 |
| 2010/0170995 A1 * | 7/2010 | Maenz | ..................... | B64C 1/26 244/131 |
| 2014/0103160 A1 * | 4/2014 | Jareno Diz Lois | ....... | B64C 3/18 244/1 A |
| 2015/0167288 A1 * | 6/2015 | Harkin | ..................... | E01D 6/00 403/107 |
| 2015/0184369 A1 * | 7/2015 | Carless | .................... | E04B 1/19 52/36.4 |
| 2015/0267397 A1 * | 9/2015 | Benthien | ................... | B64C 3/38 52/645 |
| 2015/0369212 A1 | 12/2015 | Baker | | |
| 2016/0207607 A1 * | 7/2016 | Charles | ................... | B64C 1/064 |
| 2017/0232662 A1 * | 8/2017 | Bailly | ..................... | B29C 65/48 244/123.1 |
| 2018/0050787 A1 * | 2/2018 | Kismarton | ................ | B64F 5/10 |

OTHER PUBLICATIONS

Search Report for related European Application No. 18154753.0; report dated Aug. 28, 2018.

* cited by examiner

AIRCRAFT WING SPACE FRAME

FIELD

The present disclosure generally relates to aircraft wing support structures, and more specifically to utilization of carbon fiber rods to improve structural strength and reduce weight of aircraft wings for achieving enhanced performance.

BACKGROUND

Commercial aircraft wings have traditionally incorporated interior arrays of interconnected metal parts, including spars, ribs and stringers, for meeting varying tensile, compression, bending, and torsional wing-load demands during aircraft flight and landing operations. As newer, lighter, and stronger composite materials have become available for enhancing structural support, additional possibilities exist for building stronger wings for improving performance without weight penalties of traditional metal structures.

One significant weight-savings potential can result from elimination of traditional wing box joints provided at each side of a commercial jetliner fuselage to enable structural attachment of wings to the fuselage. Wing box joints included on commercial jetliners are formed of heavily reinforced metal structures, even for newer jetliners formed primarily of non-metallic composites, often requiring massive and expensive autoclave assemblies for their manufacture. A wing support space frame formed of carbon fiber rods can provide opportunities for elimination of conventionally designed heavy metal wing box joints, and among other benefits enable avoidance of autoclave use.

SUMMARY

In accordance with one form of the present disclosure, an aircraft wing is configured for securement to a fuselage, the wing including an exterior skin that defines an interior volume. The interior volume incorporates a space frame configured to support all tensile, compression, bending and torsional loads applied to the wing during flight, landing, and ground operations. The space frame is defined by a first array of carbon fiber rods extending spanwise within the interior volume, and a second array of carbon fiber rods extending chordwise within the interior volume. The first and second arrays are secured together by a first plurality of connectors, and the exterior skin is internally secured to the space frame by a second plurality of connectors.

In accordance with another form of the present disclosure, a space frame is configured to structurally support a pair of integrated left and right aircraft wings having an exterior skin defining their interior volume. The space frame includes a first array of carbon fiber rods configured to extend spanwise within the interior volume at least midspan of each wing, and a second array of carbon fiber rods configured to extend chordwise from a leading edge to a trailing edge within the interior volume of each wing. The first and second arrays are secured together by a first plurality of connectors.

In accordance with yet another form of the present disclosure, a wing-centric method of manufacturing an aircraft includes steps of forming a unitary space frame to support a pair of integrally connected left and right aircraft wings having an exterior skin defining an interior volume of the wings. A first array of carbon fiber rods are secured to a second array of carbon fiber rods via a plurality of connectors to form the space frame, which is configured to have the first array of carbon fiber rods extend spanwise at least midspan within the interior volume of the wings, and to have the second array of carbon fiber rods extend chordwise from a leading to a trailing edge of the wings. An aircraft fuselage frame is next attached over a central portion of the space frame, and exterior skin panels are applied to the space frame and to the fuselage frame.

The features, functions, and advantages disclosed herein can be achieved independently in various embodiments or may be combined in yet other embodiments, the details of which may be better appreciated with reference to the following description and drawings.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the disclosure. Actual scope of the disclosure is as defined in the appended claims.

Figure 1:
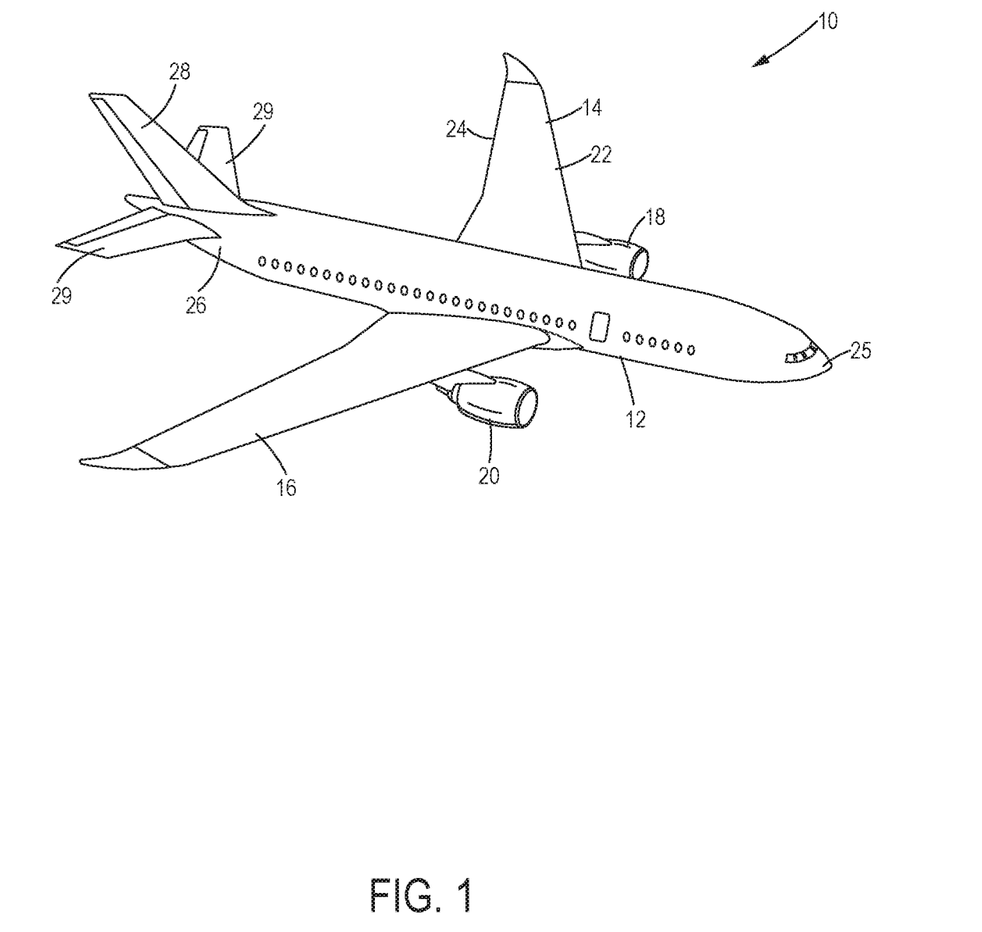
FIG. 1 is a perspective view of an aircraft in flight, the aircraft including wings incorporating a space frame, constructed in accordance with the present disclosure.

Referring initially to FIG. 1, an aircraft 10 is shown in flight. The aircraft 10 includes a main body or fuselage 12, and a pair of wings including a left wing 14 and a right wing 16, each wing extending laterally, or outwardly of the fuselage 12, in a so-called spanwise direction. Each wing 14, 16 defines an interior volume 14' and 16', respectively, for reasons to be described. A left engine 18 and a right engine 20 is supported from each of the left and right wings 14, 16, respectively. Each wing has a leading edge 22 and a trailing edge 24, the latter shown only with respect to the left wing 14. The aircraft 10 further includes a nose 25, and a tail or empennage 26, which includes a vertical stabilizer 28 and left and right horizontal stabilizers 29.

Figure 2:
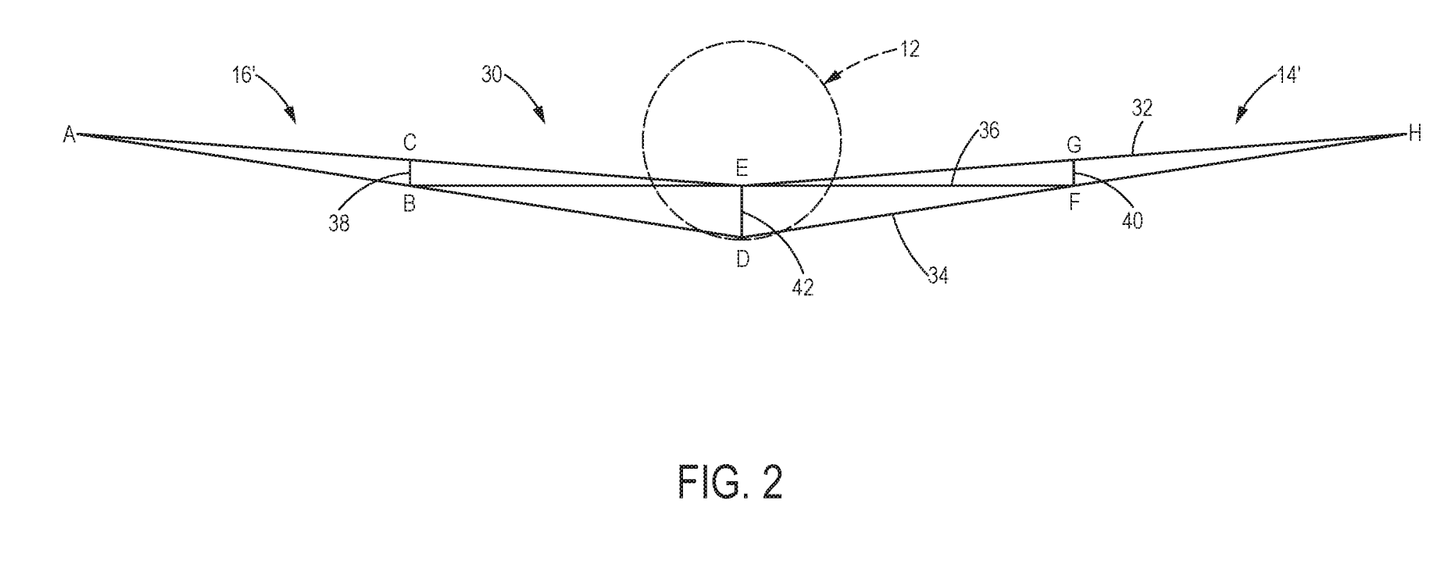
FIG. 2 is a schematic frontal view of the aircraft of FIG. 1, with its fuselage, exterior wing skin, and engines removed to reveal a wing supporting space frame formed of spanwise extending carbon fiber rods, configured in accordance with the present disclosure.

Referring now to FIG. 2, a space frame 30 is configured to extend spanwise within at least a midspan portion of the interior volumes 14' and 16' of each of the left and right wings 14, 16, respectively. The space frame 30 is designed to accommodate all tensile, compression, bending, and torsional loads applied to the wings 14 and 16, during all flight, landing, and ground operations of the aircraft wing. Although only a single upper carbon fiber rod 32 is visible in FIG. 2, the wing supporting space frame 30 includes arrays of such spanwise extending carbon fiber rods. As such, the visible carbon fiber rod 32 is the upper leading edge carbon fiber rod 32, and is only representative of a parallel array of carbon fiber rods (as will be further described in reference the chordwise cross-sectional view of the space frame in FIG. 5). In the example depicted, the array of upper carbon fiber rods 32 et seq. is formed of a plurality of parallel singular carbon fiber rods that extend from the right wing tip A to the left wing tip H, as shown. For optimized strength, each upper carbon fiber rod 32 may exist as a singular or unitary rod, rather than a connection of a series of such rods, through parallel upper load paths A-C-E-G-H, as depicted in the schematic view.

Correspondingly, a lower carbon fiber rod 34, also representative of a parallel array of carbon fiber rods, extends from the right wing tip A to the left wing tip H; each carbon fiber rod 34 may also exist as a single or unitary carbon fiber rod through lower corresponding parallel load paths A-B-D-F-H for optimized strength. The arrays of upper and lower carbon fiber rods 32, 34 are secured together in a manner to be described.

As those skilled in the art will appreciate, the use of carbon fiber rods can be advantageous for optimizing load-bearing strength of wing structures. This is because individual carbon fibers within a carbon fiber rod are oriented along the axis of the rod. In a truss-style structure, tensile and compressive loads act only along the axis of each rod, thus in a direction of optimal strength. On the other hand, the carbon fibers contained within composite skins are oriented in a plurality of directions, which comparatively reduces effective strength of skin-based composites.

It will be appreciated that during flight the upper carbon fiber rods 32 will be primarily subject to compression loads, while the lower carbon fiber rods 34 will be primarily subject to tensile loads. This is because during flight, the entire weight of the aircraft is borne by the wings, tending to bend them upwardly from tip to tip. The qualifier "primarily" is applied because wing loads vary considerably during flight, and most significantly during moderate to severe turbulence. Conversely, during ground operations, the upper carbon fiber rod 32 may be subject to tensile loads, while the lower carbon fiber rod 34 is subject to compression loads. The reason for the latter is because on the ground the wings do not support the weight of the fuselage, as those skilled in the art will appreciate.

To assist in managing compression loading of the carbon fiber rods within the space frame 30, a reinforcing midspan carbon fiber rod 36 (also representative of a parallel array of rods 36) extends along a load path defined by B-E-F, along with a plurality of chordwise arrays of carbon fiber rods, the latter depicted only as simple vertical wing elements 38 and 40 and vertical fuselage element 42 in the schematic view. The reinforcing midspan rods 36 act to transfer massive compressive loads from one wing to the other, entirely eliminating any need to transfer such loads to the fuselage, as commonly done via the noted heavy metal wing box joints formed at the sides of a typical jetliner fuselage. As will become more apparent, all chordwise arrays of carbon fiber rods of the space frame 30 are configured to be secured to all spanwise arrays carbon fiber rods. As such, the rods including 32 and 34 described above are connected to chordwise rods (described below) by sleeve connectors, to be described.

Figure 3:
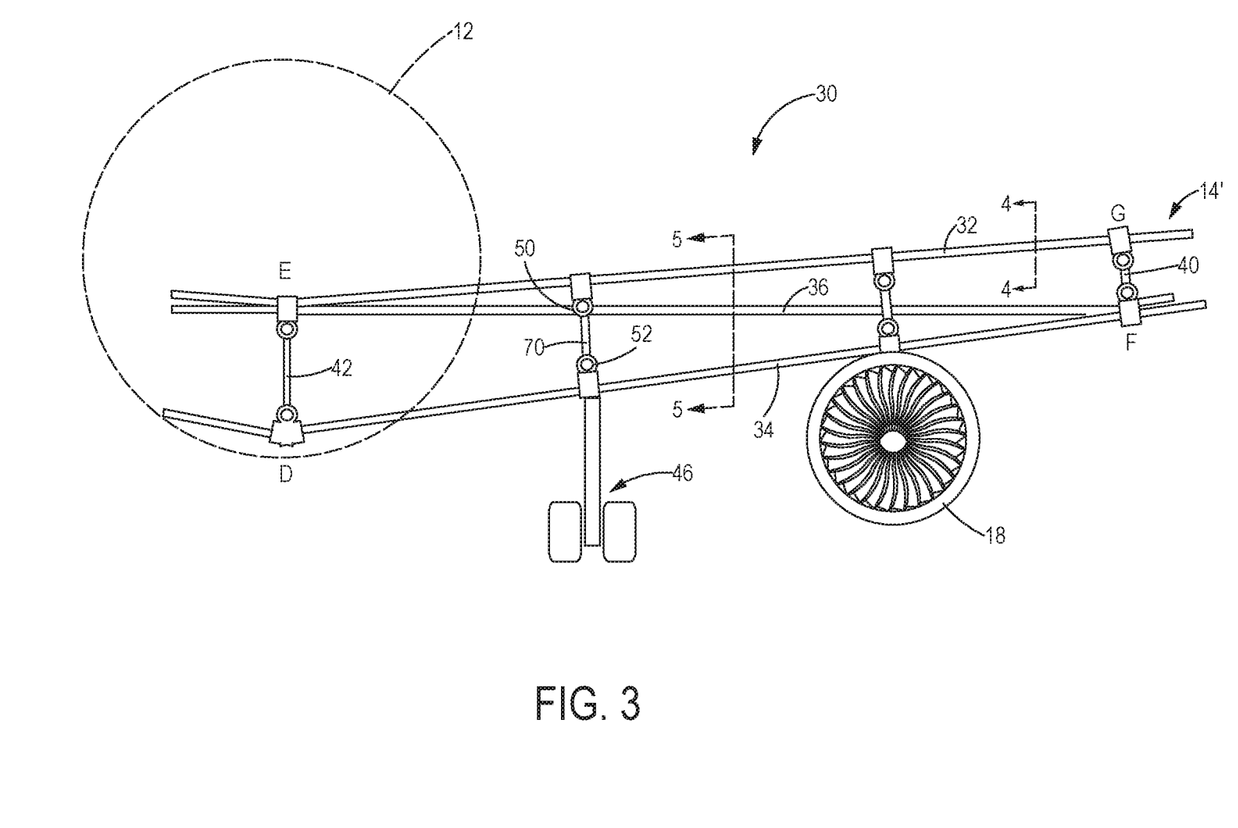
FIG. 3 is a schematic portion of the view of FIG. 2, to show greater detail of the space frame, constructed in accordance with the present disclosure.

Referring now to FIG. 3, only a portion, E-G, of the upper spanwise load path A-C-E-G-H (FIG. 2) is shown to provide greater detail of the left interior volume 14', including relative positions of the jet engine 18 and left main landing gear 46 on that particular spanwise subsection of the wing 14. A corresponding portion, D-F, of the lower spanwise load path A-B-D-F-H (FIG. 2) is also shown, in reference to the latter aircraft engine and landing gear structures 18 and 46. A plurality of sleeve connectors 50 and 52 are utilized to connect adjacent upper and lower spanwise and chordwise, i.e. orthogonally oriented, carbon fiber rods together (see FIG. 5 for chordwise view). As particularly identified above the landing gear 46, each of the sleeve connectors 50 and 52 is connected to a vertically extending rigid shaft 70. The sleeve and shaft fittings 50, 52, and 70 are utilized throughout the space frame 30 to secure the carbon fiber rods together. It will be noted that the latter sleeve and shaft fittings 50, 52, and 70 are specific structures within each of the earlier noted chordwise-extending vertical wing and fuselage elements 38, 40, and 42. Ideally, at least two of such chordwise elements within the left and right wings can be positioned to align vertically over the landing gear and engine structures for enhanced strength, as shown in FIG. 3. The sleeve and shaft fittings, further described below, may be secured together by conventionally obtained fasteners and/or other connective structures (not shown).

Figure 4:
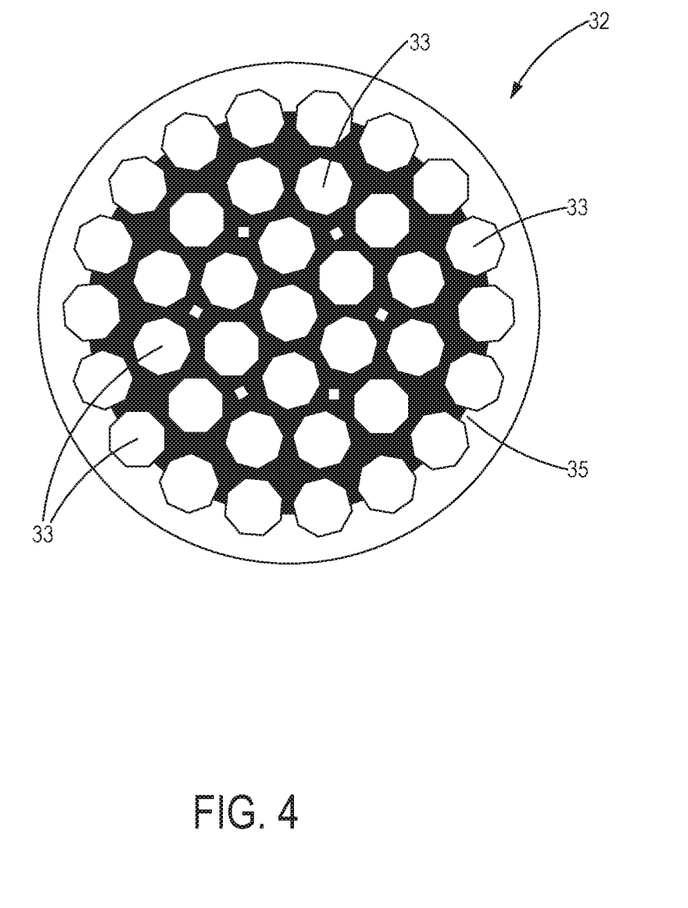
FIG. 4 is a cross-sectional view, taken along lines 4-4 of FIG. 3, of a carbon fiber rod that may be utilized in at least one embodiment of the space frame, constructed in accordance with the present disclosure.

Referring now also to FIG. 4, a cross-section of the upper spanwise carbon fiber rod 32 (FIG. 3) reveals one embodiment be formed of a sheath or bundle of multiple smaller carbon fiber rods 33, secured together, for example by a composite adhesive 35. This embodiment is only one carbon fiber rod of numerous commercially available variants.

Figure 5:
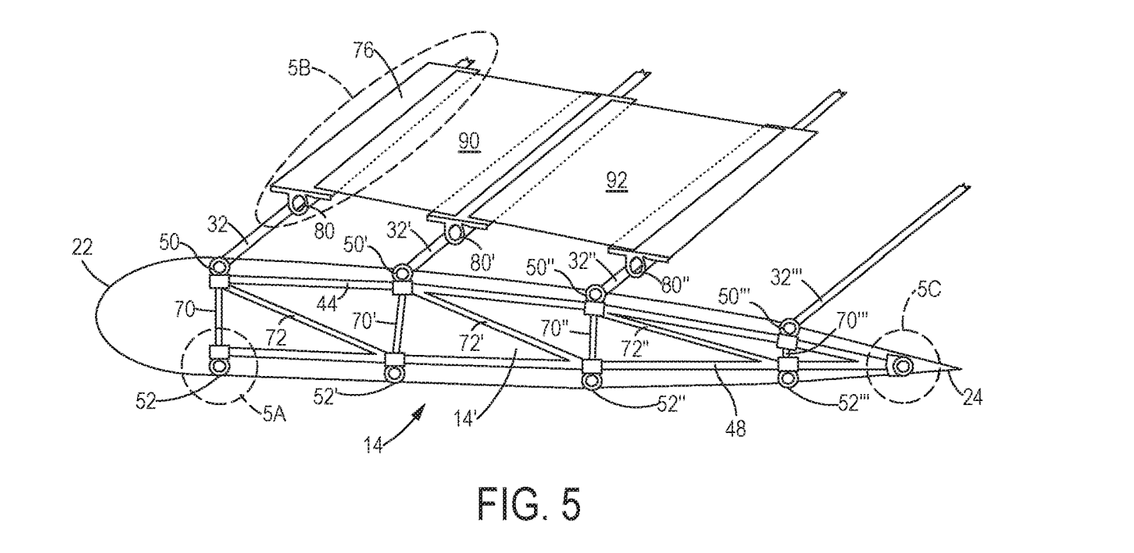
FIG. 5 is a chordwise cross-sectional view, taken along lines 5-5 of FIG. 3, of the space frame as may be configured for a wing of the aircraft of FIG. 1, including a perspective view of at least one embodiment of exterior skin panels applied to the space frame, in accordance with the present disclosure.

In FIG. 5, the midspan carbon fiber rods 36 have been removed to better reveal chordwise details of the space frame 30, which includes an array of upper and lower chordwise extending carbon fiber rods 44 and 48, respectively. At the leading edge, a compound sleeve connector 50 secures the upper spanwise carbon fiber rod 32 to the upper chordwise carbon fiber rod 44. Similarly, a compound sleeve connector 52 secures the lower spanwise carbon fiber rod 34 (FIG. 3) to the lower chordwise carbon fiber rod 48. The rigid shaft 70 holds the compound sleeves 50 and 52 together. Although the described sleeve and shaft fittings can be formed of high strength aviation-grade metals, such as titanium and/or aluminum alloys, it is envisioned that fiber composite fittings of sufficient strength could also be employed.

As will be appreciated, the same connections are replicated chordwise from the leading edge 22 to the trailing edge 24 of the interior volume 14'. Thus, between the leading edge 22 and the trailing edge 24 are similar corresponding structures 50', 50" and 50"', along with 52', 52", 52"', and 70', 70", 70"', all configured to secure respective upper spanwise carbon fiber rods 32', 32", and 32"' to upper chordwise carbon fiber rods 44, and similar lower spanwise carbon fiber rods (shown only as 34 in FIG. 3 to the lower chordwise carbon fiber rods 48.

Elongated rigid shafts 72, 72', and 72", which may also be formed of metal, may be angled to extend between the upper and lower compound sleeves 50, 52, as shown. This arrangement constitutes an angled bracing that provides a truss-like framing for overall reinforcement of the space frame 30.

Figure 5A:
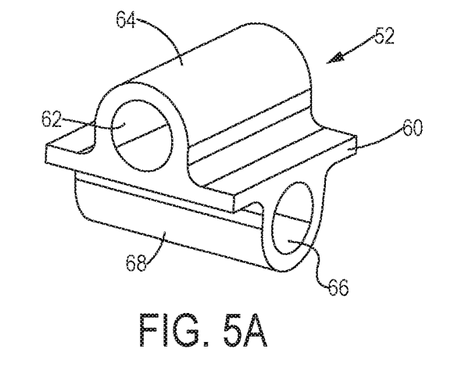
FIG. 5A is a perspective view of a compound sleeve component shown in FIG. 5, that may be utilized to connect orthogonally oriented spanwise and chordwise extending carbon fiber rods of the disclosed space frame.
Figure 5B:
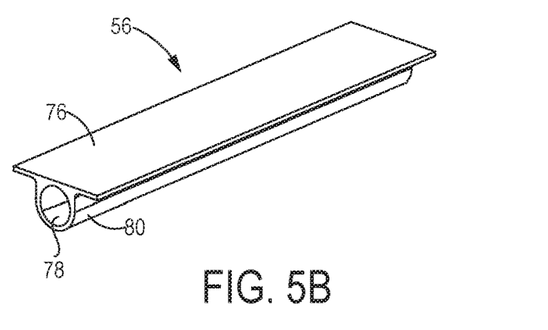
FIG. 5B is a perspective view of an elongated compound sleeve and flange component shown in FIG. 5, that may be utilized to attach skin panels to the disclosed space frame.
Figure 5C:
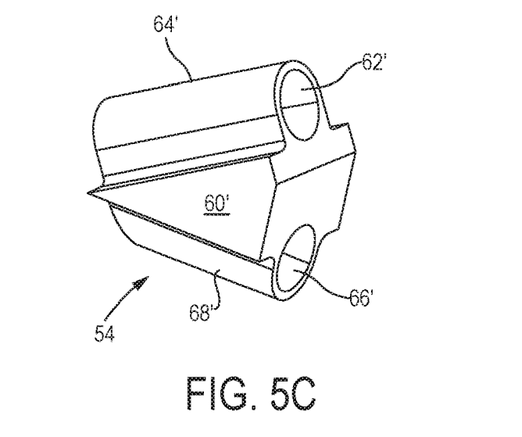
FIG. 5C is a perspective view of a compound sleeve component shown in FIG. 5, that may be utilized to attach chordwise extending upper and lower carbon fiber rods, such as at the trailing edge of a wing of FIG. 1.

Referring now also to FIGS. 5A, 5B, and 5C, it will be noted that alternative compound sleeve connector structures can be employed to secure the carbon fiber rods together in the manner described. Thus, the sleeve connector 52, utilized to secure orthogonally oriented lower spanwise carbon fiber 34 to lower chordwise carbon fiber 48, is detailed in FIG. 5A. The compound connector 52 includes a robust flange aperture separator 60, along with an upper aperture 62 within a barrel 64. The sleeve connector 52 also incorporates a lower aperture 66 which extends orthogonally with respect to the upper aperture 62. The lower aperture 66 is in a separate lower barrel 68, rigidly and structurally separated by the flange aperture separator 60. In the disclosed embodiment, the compound sleeve connector 50 (FIG. 5) may be identical to the sleeve connector 52.

In FIG. 5B, an elongated skin panel sleeve connector 56 acts as a fitting for attachment of exterior skin panels 90, 92 (FIG. 5) to the space frame 30. A skin support flange 76 is integrally attached to a barrel 80 containing an aperture 78. Thus, the skin panel 90 (FIG. 5) is installed over a portion of the upper carbon fiber rod 32, adjacent and in between the sleeve connectors 50 and 50', as shown. The exterior skin panels 90, 92 may be formed of a laminated composite, or of a conventional aluminum alloy, for example.

FIG. 5C depicts an angled compound sleeve connector 54 which can be used to secure upper chordwise carbon fiber rods 44 angled with respect to the lower chordwise carbon fiber rods 48 at locations, such as near the trailing edge 24 of the wing 14 (FIG. 5), for example. For this purpose, an angled flange aperture separator 60' separates adjacently angled apertures 62' and 66', situated in respective barrels 64' and 68', as shown. Obviously, an array of such chordwise upper and lower carbon fiber rods 44, 44', 44", etc. and 48, 48', 48" etc. would be utilized, similar to earlier described upper and lower spanwise carbon fiber rods 32, 32', 32", etc. and 34, 34', 34", etc., as will be appreciated by those skilled in the art.

Figure 6:
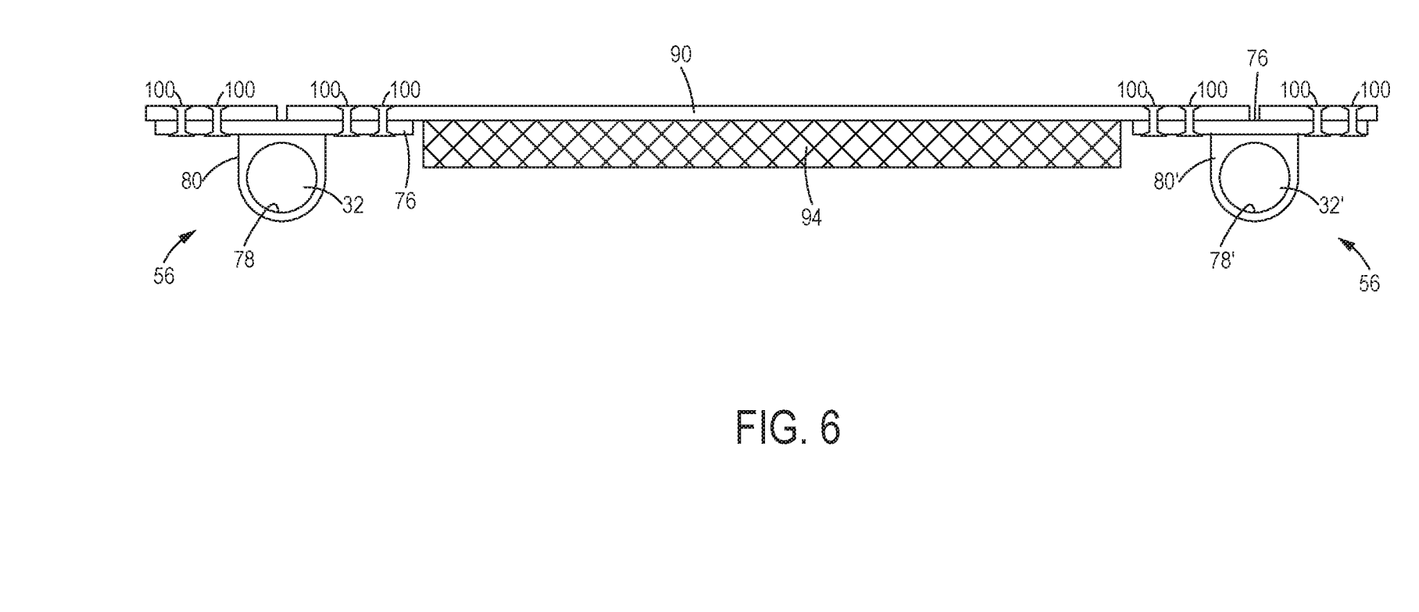
FIG. 6 is a chordwise cross-section view of a skin panel installation situated between an upper pair of spanwise extending carbon fiber rods, revealing details of the elongated compound sleeve and flange component of FIG. 5B.

Referring now also to FIG. 6, additional details of the skin panel 90 may include a honeycomb skin panel reinforcement 94 attached to the interior of the exterior skin panel 90. The honeycomb skin panel reinforcement 94, which may, for example, also be formed of a laminated composite or an aluminum alloy, is shown secured by skin panel sleeve connectors 56, extending between upper spanwise carbon fiber rods 32 and 32'. Each panel may be secured to the skin support flange 76 of each connector 56 via rivets 100, as depicted.

Finally, the disclosed space frame 30 may provide alternative and less costly approaches to manufacturing aircraft, including a wing-centric approach of building the wings to receive the fuselage rather than vice versa. Thus, a manufacturing sequence of building an aircraft without necessity of conventional heavy structural metal wing box joints formed at either side of the fuselage for attaching the left and right wings may, for example, involve the steps of:

a) forming a unitary space frame to support a pair of integrated left and right aircraft wings having an exterior skin defining an interior volume of the wings, by securing a first array of carbon fiber rods to a second array of carbon fiber rods via a plurality of sleeve connectors;

b) configuring the space frame to have the first array of carbon fiber rods extend spanwise within the interior volume at least midspan of each wing, and to have the second array of carbon fiber rods extend chordwise from a leading edge to a trailing edge of the wings;

c) attaching an aircraft fuselage frame over a central portion of the space frame; and d) applying skin panels to the space frame and to the fuselage frame.

In a wing-centric manufacturing approach, the fittings can be integral compound sleeve and shaft connectors for securing above referenced orthogonally adjacent spanwise and chordwise arrays of carbon fiber rods together. The fuselage may then be secured to the single piece by commercially available fittings.

The disclosed embodiment of the space frame 30 may have other variations and alternative constructions neither described nor suggested herein. For example, although described in terms of specific structures and components, other configurations and/or other components may be utilized, and potentially in other environments. Moreover, although the disclosure presents structures in only the shapes and sizes depicted, numerous variations of the disclosed structures may be envisioned for use in alternative embodiments, as may be appreciated by those skilled in the art.

What is claimed is:

1. An aircraft wing comprising:
an exterior skin defining an interior volume;
the interior volume having a space frame configured to support all tensile, compression, bending and torsional loads applied to the wing during flight, landing, and ground operations of the aircraft wing;
wherein the space frame is defined by a first array of carbon fiber rods extending spanwise within the interior volume, and a second array of carbon fiber rods extending chordwise within the interior volume; the first and second arrays secured together by a first plurality of connectors, and wherein the exterior skin is secured to the space frame by a second plurality of connectors;
wherein the first array of carbon fiber rods comprises upper and lower carbon fiber rods, and the space frame further comprises a third array of midspan carbon fiber rods that also secure the upper carbon fiber rods to the lower carbon fiber rods via the first plurality of connectors;
wherein the midspan carbon fiber rods comprise a distinct load path within the space frame, the midspan carbon fiber rods being configured to extend spanwise from an aircraft fuselage to a midspan portion of the interior volume of the wing;
wherein the fuselage and the midspan portion each include a plurality of vertical elements that space the upper carbon fiber rods from the lower carbon fiber rods; and
wherein each midspan carbon fiber rod is fixed to, and extends between, at least one pair of the vertical elements.

2. The aircraft wing of claim 1, wherein the space frame comprises a primary supporting structure of the wing, and wherein the exterior skin is configured to support only aerodynamic loads.

3. The aircraft wing of claim 1, wherein the first plurality of connectors comprises sleeve connectors secured to the carbon fiber rods, each sleeve connector securing one of the carbon fiber rods of the first array to one of the carbon fiber rods of the second array.

4. The aircraft wing of claim 3, wherein elongated rigid shafts extend on an angle between the sleeve connectors to provide angled bracing between upper and lower chordwise carbon fiber rods of the second array of carbon fiber rods.

5. The aircraft wing of claim 1, comprising an integrated system of left and right wings, wherein the space frame comprises at least a midspan portion of the interior volume of both left and right wings.

6. The aircraft wing of claim 5, wherein the space frame extends spanwise at least midspan of the interior volume of each wing.

7. The aircraft wing of claim 5, wherein the upper spanwise extending carbon fiber rods are in a state of compression when the wing is in flight, and in a state of tension when the wing is not in flight.

8. The aircraft wing of claim 5, wherein the lower spanwise extending carbon fiber rods are in a state of tension when the wing is in flight, and in a state of compression when the wing is not in flight.

9. The aircraft wing of claim 8, wherein the midspan carbon fiber rods are configured to transfer compressive loads between the left and right wings.

10. The aircraft wing of claim 9, wherein each midspan carbon fiber rod structurally links an upper spanwise carbon fiber rod with a lower spanwise carbon fiber rod.

11. A space frame comprising a pair of integrated left and right aircraft wings having an exterior skin defining an interior volume of the wings; the space frame comprising:
a first array of carbon fiber rods configured to extend spanwise within the interior volume at least midspan of each wing, and a second array of carbon fiber rods configured to extend chordwise from a leading edge to a trailing edge within the interior volume; the first and second arrays secured together by a first plurality of connectors, and the exterior skin is secured to the space frame by a second plurality of connectors;
wherein the first array of carbon fiber rods comprises upper and lower spanwise extending carbon fiber rods, and the space frame further comprises a third array of midspan carbon fiber rods that also secure the upper carbon fiber rods and the lower carbon fiber rods together via the first plurality of connectors;
wherein the midspan carbon fiber rods comprise a distinct load path within the space frame, the midspan carbon fiber rods being configured to extend spanwise from an aircraft fuselage to a midspan portion of the interior volume of each wing;
wherein the fuselage, and the midspan portion of each wing, include a plurality of vertical elements that space the upper carbon fiber rods from the lower carbon fiber rods; and
wherein each midspan carbon fiber rod is fixed to, and extends between, at least one pair of the vertical elements.

12. The space frame of claim 11, wherein the first plurality of connectors comprises sleeve connectors coupled to the carbon fiber rods of the first and second arrays.

13. The space frame of claim 12, wherein elongated rigid shafts extend on an angle between the first plurality of connectors to provide angled bracing between upper and lower chordwise carbon fiber rods of the second array of carbon fiber rods.

14. The space frame of claim 11, wherein each of the first and second arrays of carbon fiber rods include upper and lower carbon fiber rods secured together by the first plurality of connectors.

15. The space frame of claim 11, wherein the first plurality of connectors include compound sleeve connectors, wherein each compound sleeve connector is configured to tie together an upper carbon fiber rod of the first array to an upper carbon fiber rod of the second array, and to tie together a lower carbon fiber rod of the first array to a lower carbon fiber rod of the second array.

16. The space frame of claim 11, further comprising a second plurality of sleeve connectors, and wherein each of the second plurality of sleeve connectors comprises an elongated sleeve having an elongated skin panel sleeve connector configured to secure a skin panel to the space frame.

17. The space frame of claim 16, wherein each of the second plurality of sleeve connectors is configured to extend spanwise over the first array of carbon fiber rods.

18. The space frame of claim 11, wherein the space frame extends spanwise at leastmidspan of the interior volume of each wing.

19. The aircraft wing of claim 3, further comprising a second plurality of sleeve connectors, and wherein each of the second plurality of sleeve connectors comprises an elongated sleeve having an elongated skin panel sleeve connector configured to secure a skin panel to the space frame.

20. The aircraft wing of claim 19, wherein each of the second plurality of sleeve connectors is configured to extend spanwise over the first array of carbon fiber rods.

* * * * *